(12) United States Patent
Runde

(10) Patent No.: US 10,076,979 B2
(45) Date of Patent: Sep. 18, 2018

(54) RECLINER ASSEMBLY WITH IMPROVED CHUCK PERFORMANCE

(71) Applicant: Magna Seating Inc, Aurora (CA)

(72) Inventor: David M Runde, Beverly Hills, MI (US)

(73) Assignee: Magna Seating Inc., Aurora, Ontario (CA)

( * ) Notice: Subject to any disclaimer, the term of this patent is extended or adjusted under 35 U.S.C. 154(b) by 0 days.

(21) Appl. No.: 15/410,963

(22) Filed: Jan. 20, 2017

(65) Prior Publication Data

US 2017/0203671 A1   Jul. 20, 2017

Related U.S. Application Data

(60) Provisional application No. 62/280,835, filed on Jan. 20, 2016.

(51) Int. Cl.
*B60N 2/23* (2006.01)
*B60N 2/235* (2006.01)
*F16H 25/18* (2006.01)

(52) U.S. Cl.
CPC .......... *B60N 2/2356* (2013.01); *F16H 25/18* (2013.01)

(58) Field of Classification Search
CPC .... B60N 2/2356; B60N 2/235; B60N 2/2358; F16H 25/18
See application file for complete search history.

(56) References Cited

U.S. PATENT DOCUMENTS

| 5,769,494 | A | 6/1998 | Barrere et al. |
| 5,857,746 | A | 1/1999 | Barrere et al. |
| 6,325,458 | B1 * | 12/2001 | Rohee .................... B60N 2/235 297/367 R |
| 7,475,945 | B2 | 1/2009 | Reubeuze et al. |
| 7,828,386 | B2 | 11/2010 | Reubeuze et al. |
| 2017/0037945 | A1 * | 2/2017 | Maeda .................... A47C 1/02 |

* cited by examiner

*Primary Examiner* — Thomas C Diaz
(74) *Attorney, Agent, or Firm* — Miller Canfield

(57) ABSTRACT

A disc recliner assembly has a guide plate including one pair of spaced apart and parallel guide walls and an outer peripheral rim having a plurality of radially projecting teeth. A tooth plate has an outer peripheral rim with a plurality of radially projecting teeth axially aligned with the teeth of the guide plate. A pawl is mounted between the guide plate and the tooth plate. The pawl is guided by the pair of guide walls between an unlocked position with the teeth of the pawl spaced and disengaged from teeth of the guide plate and the tooth plate to allow rotational movement of the guide plate relative to the tooth plate and a locked position with the teeth of the pawl in messed engagement with the teeth of the guide plate and the tooth plate to prevent rotational movement of the guide plate relative to the tooth plate.

6 Claims, 6 Drawing Sheets

RECLINER ASSEMBLY WITH IMPROVED CHUCK PERFORMANCE

CROSS-REFERENCE TO RELATED APPLICATION

This application claims priority to and all the benefits of U.S. Provisional Application No. 62/280,835, filed on Jan. 20, 2016.

BACKGROUND OF THE INVENTION

1. Field of the Invention

The present invention relates to a recliner assembly for an automotive seat. More specifically, the present invention relates to a disc recliner assembly having a cam for engaging a locking pawl to improve chuck performance in the disc recliner assembly.

2. Description of Related Art

Many automotive seats have a seat back whose position, relative to a seat cushion, can be altered by a vehicle occupant for comfort positioning and/or to provide access to an interior of a vehicle. Disc recliner mechanisms are commonly employed to provide relative pivotal movement between the seat back and the seat cushion and such disc recliner mechanisms often include a tooth plate and a guide plate, wherein the guide plate includes a set of pawls that can selectively interlock with the tooth plate to maintain the seat back in a desired position.

Typically, the tooth plate of the disc recliner mechanism is affixed to the seat back and the guide plate portion of the disc recliner mechanism is affixed to the seat cushion, although the mechanism can also be mounted in the opposite sense.

While such disc recliner mechanisms are well known and are widely employed, they do suffer from disadvantages. In particular, once the seat back is set in a desired locked position, any movement of the pawls resulting from excessive clearances between the pawls and guides on the guide plate will result in undesired movement of the seat back with respect to the seat base. Such undesired movement of the seat in the locked position is typically referred to as "backlash" or "chuck."

To avoid undesired chuck, the pawls and guide plate must be formed to extremely tight tolerances, either directly when the guide plate is formed, or via additional manufacturing steps after the guide plate has been formed. As is apparent to those of skill in the art, meeting such extremely tight manufacturing tolerances or performing additional manufacturing steps both result in increased expense and a desired reduction in backlash or chuck may still not be achieved.

It is desired to have a disc recliner mechanism that has reduced or negligible chuck and which can be manufactured at a reasonable cost.

SUMMARY OF THE INVENTION

According to one embodiment of the present invention, a disc recliner assembly is provided having a guide plate including at least one pair of spaced apart and parallel guide walls and an outer peripheral rim having a plurality of radially projecting teeth. A tooth plate includes an outer peripheral rim having a plurality of radially projecting teeth axially aligned with the teeth of the guide plate. At least one pawl is mounted between the guide plate and the tooth plate. The pawl includes an inner proximal edge and an outer distal edge defined by a plurality of teeth. The pawl is guided by the pair of guide walls between an unlocked position with the teeth of the pawl spaced and disengaged from teeth of the guide plate and the tooth plate to allow rotational movement of the guide plate relative to the tooth plate and a locked position with the teeth of the pawl in messed engagement with the teeth of the guide plate and the tooth plate to prevent rotational movement of the guide plate relative to the tooth plate. A cam plate is rotatably mounted between the guide plate and the tooth plate and operatively coupled to the pawl wherein rotating the cam plate in a first direction moves the pawl radially outward with respect to the guide plate to the locked position engaged with the teeth of the guide plate and tooth plate and rotating the cam plate in an opposite second direction moves the pawl radially inward with respect to the guide plate to the unlocked position spaced and disengaged from the teeth of the guide plate and tooth plate. The pawl includes a ledge portion facing opposite the teeth and defining an angled wedge surface and the cam plate includes at least one radially projecting cam lobe engaged with the angled wedge surface for applying a rotational moment to the pawl in the locked position thereby wedging the pawl between the pair of guide walls.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
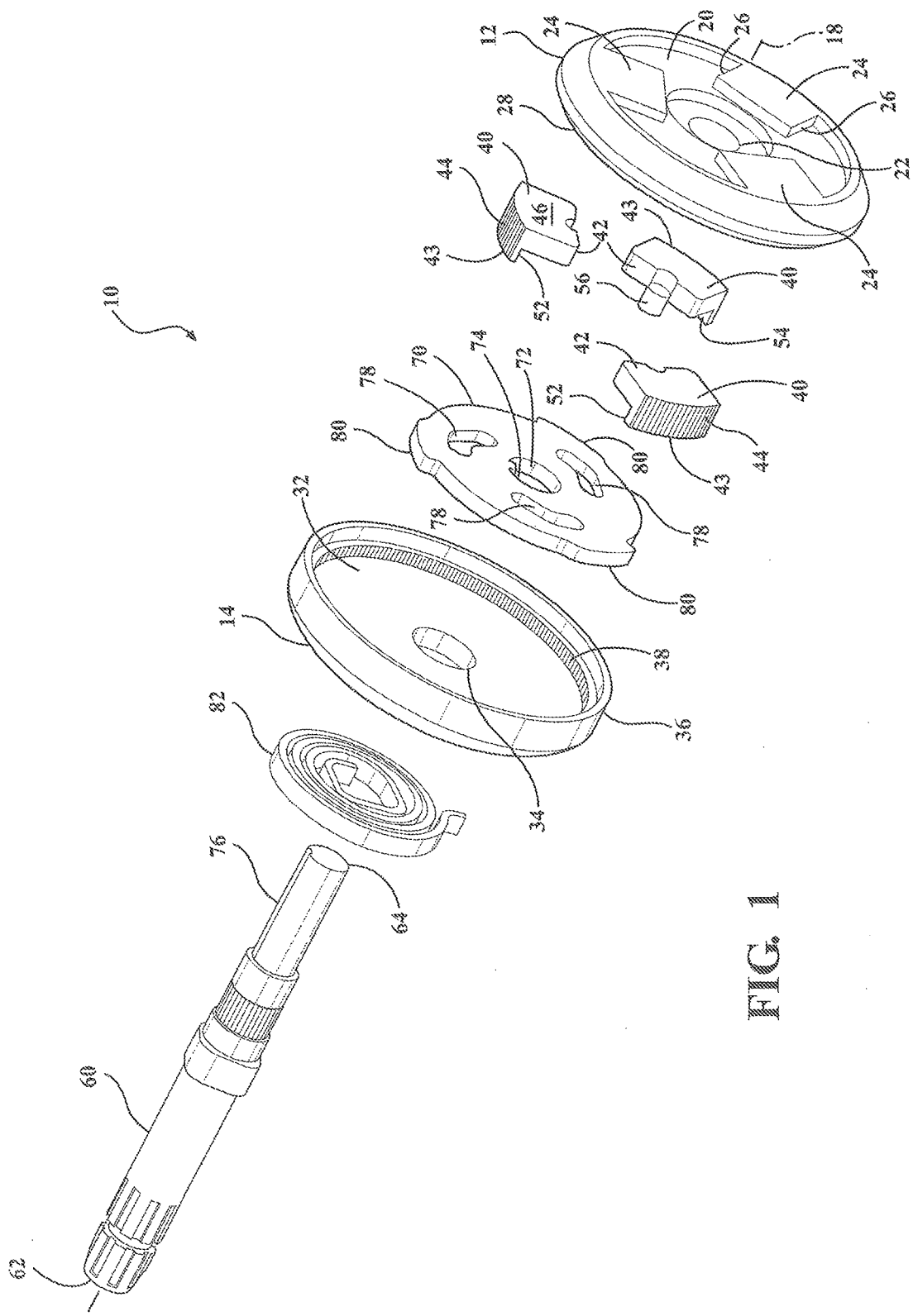
FIG. 1 is an exploded perspective view of a disc recliner assembly according to a preferred embodiment of the invention.
Figure 2:
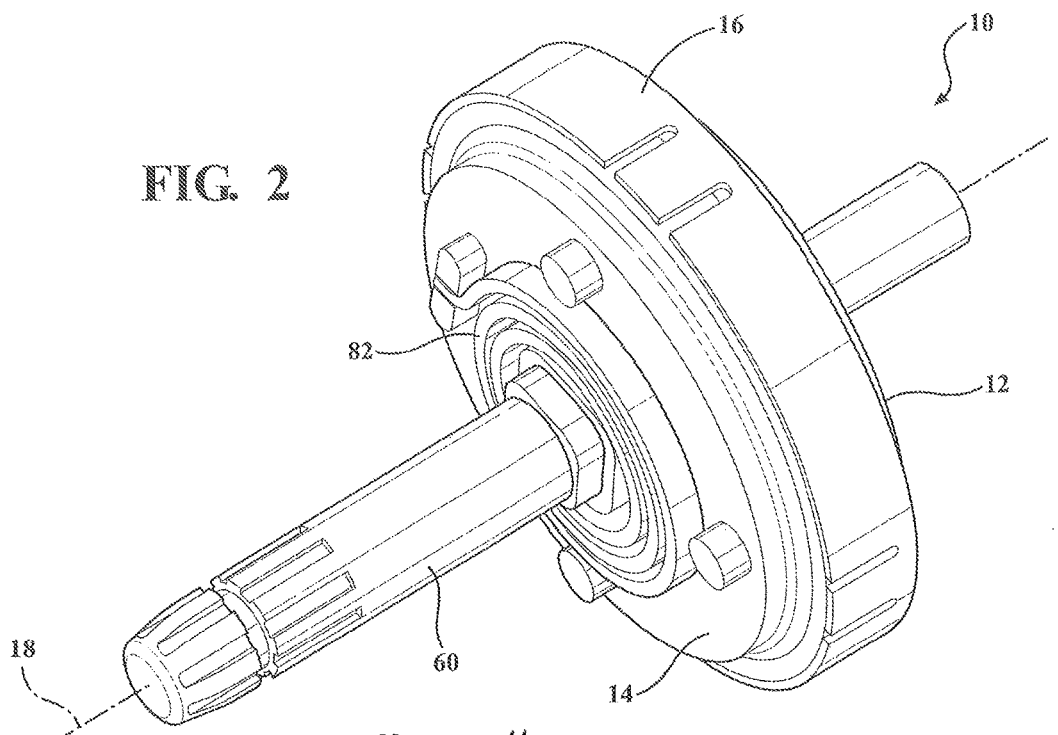
FIG. 2 is a assembled perspective view of the disc recliner assembly of FIG. 1.

A recliner assembly, or more specifically, a disc recliner assembly in accordance with one embodiment of the present invention is indicated generally at 10 in FIG. 1. The disc recliner assembly 10 is adapted to be coupled between a seat back and seat cushion of an automotive vehicle, as is commonly known in the art, for selective actuation between a locked condition preventing pivotal movement of seat back relative to the seat cushion and an unlocked condition allowing pivotal movement of the seat back relative to the seat cushion. Referring to FIGS. 1 and 2, the disc recliner assembly 10 includes a movable guide plate 12 that is adapted to be fixedly secured to the seat back and a fixed tooth plate 14 that is adapted to be fixedly secured to the seat cushion. The guide plate 12 and the tooth plate 14 are held together by a retaining ring 16 in a manner well known in the art such that the guide plate 12 can rotate about a pivot axis 18 relative to the tooth plate 14. It is understood that rotation of the guide plate 12 relative to the tooth plate 14 causes pivotal movement of the seat back relative to the seat cushion. It should be appreciated that the tooth plate may be movable and secured to the seat back with the guide plate fixed and secured to the seat cushion without varying from the scope of the invention.

Figure 6:
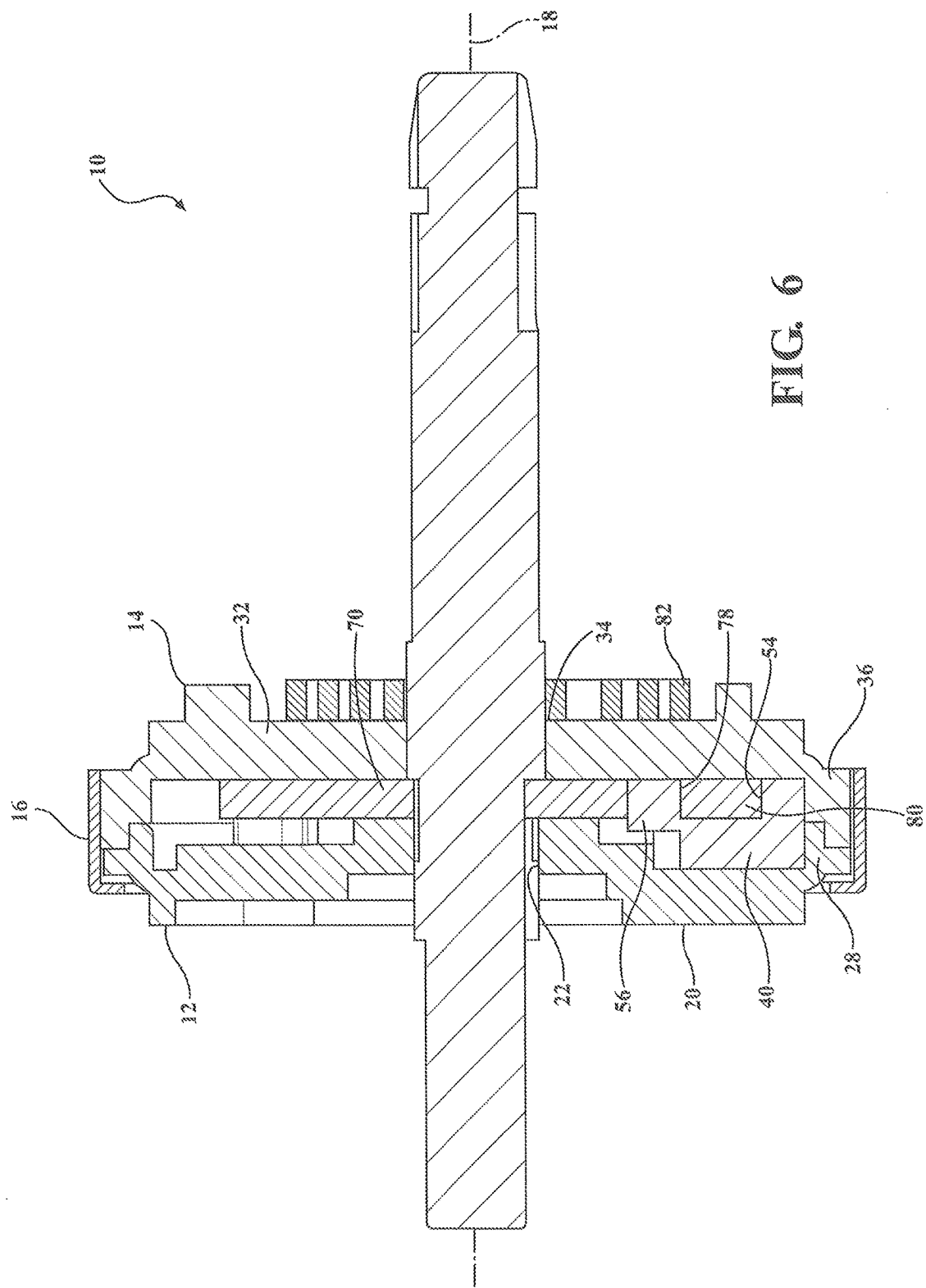
FIG. 6 is a cross-sectional view of the disc recliner assembly.
Figure 7:
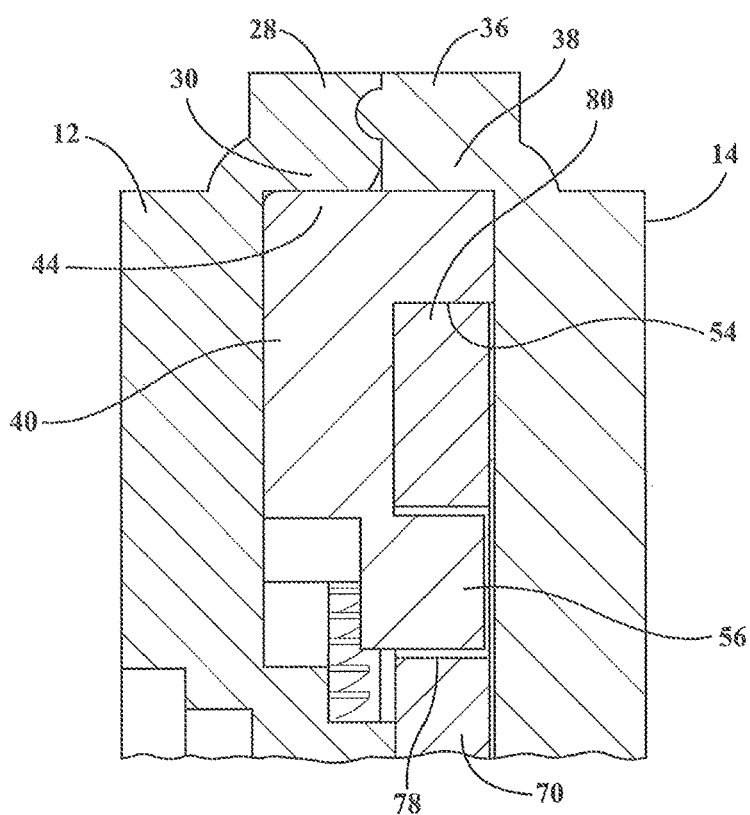
FIG. 7 is a fragmentary cross-sectional view of the disc recliner assembly in the locked condition.
Figure 8:
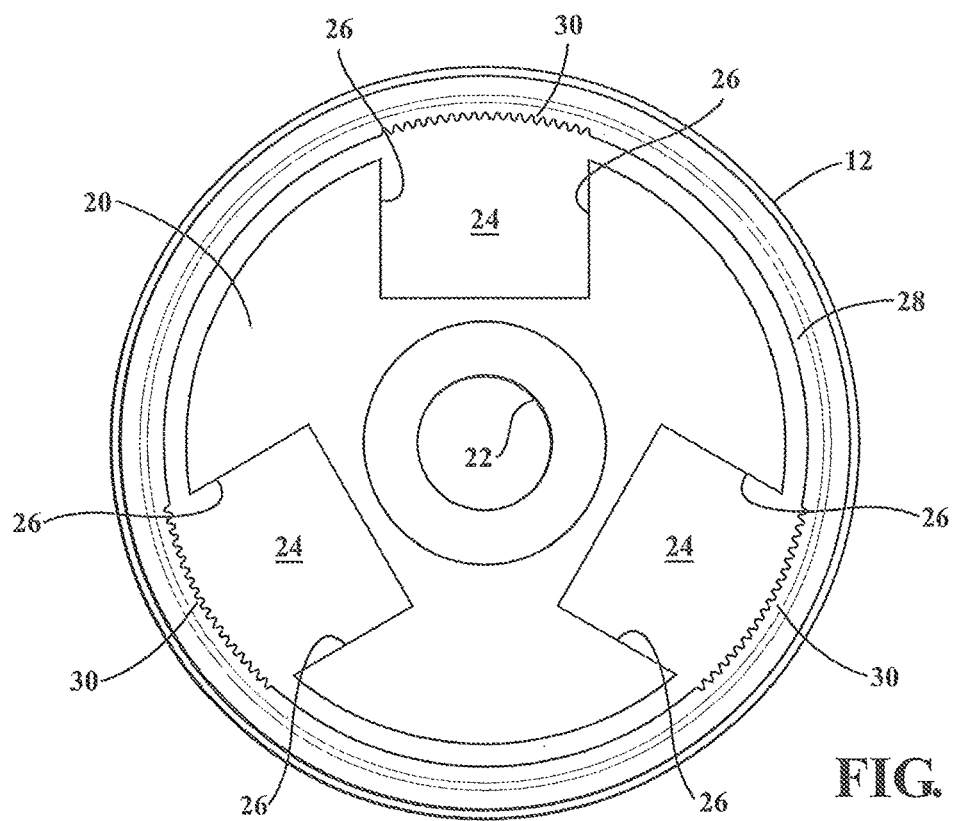
FIG. 8 is a plan view of the tooth plate of the disc recliner assembly.

Referring to FIGS. 1, 6 and 8, the guide plate 12 is circular, generally cup-shaped, and includes an end wall 20 having a first central bore 22 extending axially therethrough. The first central bore 22 is coaxial with the pivot axis 18. An outer side of the end wall 20 is adapted to be fixedly secured to the seat back by any suitable means. An inner side of the guide plate 12 includes a plurality of equally spaced apart and generally rectangular recessed portions 24 that define generally parallel and opposing guide walls 26. The guide plate 12 further includes an outer peripheral rim 28 extending axially from the end wall 20 and a series of locking teeth 30 are formed on the inner radial side of the rim 28 facing each of the recessed portions 24 and extending the width between the opposing guide walls 26.

Referring to FIGS. 1 and 6, the tooth plate 14 is circular, generally cup-shaped, and includes an end wall 32 having a second central bore 34 extending axially therethrough. The second central bore 34 is also coaxial with the pivot axis 18. An outer side of the end wall 32 is adapted to be fixedly secured to the seat cushion by any suitable means. A peripheral rim 36 extends axially from the end wall 32 and circumferentially around the tooth plate 14 for mating engagement with the peripheral rim 28 on the guide plate 12. A plurality of radially extending teeth 38 are formed on the inner radial side of the rim 36 and axially aligned with the locking teeth 30 on the guide plate 12.

The disc recliner assembly 10 further includes a plurality of pawls 40, wherein one of the pawls 40 is seated in each of the recessed portions 24 of the guide plate 12 and guided by and between opposing guide wall 34 to move radially inward and outward to actuate the disc recliner assembly 10 between the locked and unlocked conditions. In the embodiment shown, there are three pawls 40 and each pawl 40 includes an inner proximal edge 42 and an opposite outer distal edge 43 having a plurality of radially extending teeth 44 adapted for meshing engagement with the teeth 30 on the guide plate 12 and the teeth 38 on the tooth plate 14. More specifically, in the locked condition, the pawls 40 are disposed radially outwardly in a first position such that the teeth 44 on the pawls 40 are in meshing engagement with the teeth 30, 38 on the guide plate 12 and tooth plate 14, respectively, to prevent rotation of the guide plate 12 relative to the tooth plate 12. In the unlocked condition, the pawls 40 are disposed radially inwardly in a second position such that the teeth 44 on the pawls 40 are spaced from and disengaged from the teeth 30, 38 on the guide plate 12 and tooth plate 14, respectively, to allow rotation of the guide plate 12 relative to the tooth plate 12.

Figure 4:
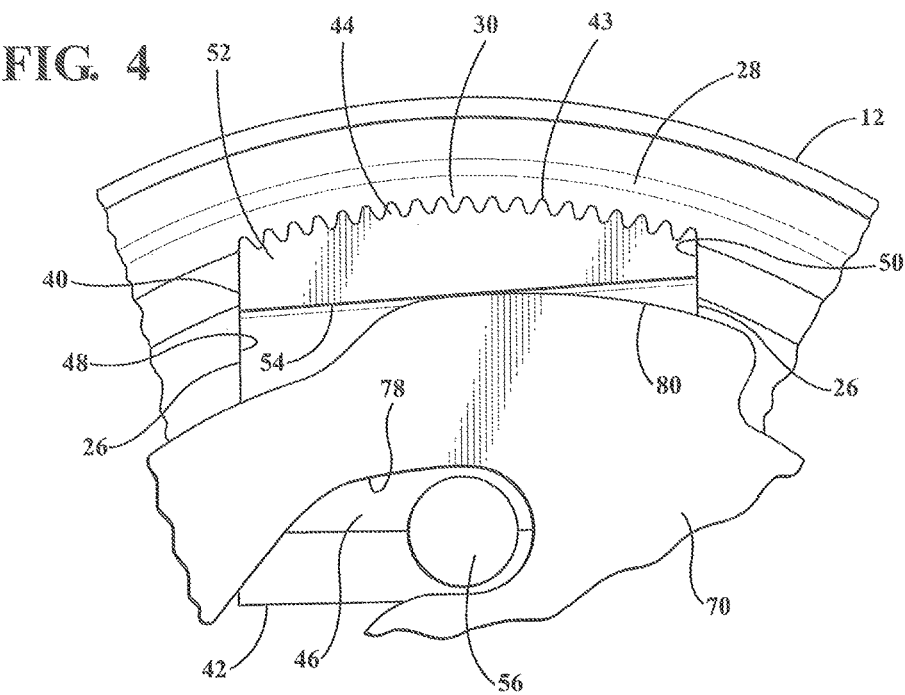
FIG. 4 is an enlarged, fragmentary plan view of the cam and pawl engaged with the tooth plate in a locked condition.

Referring to FIGS. 1 and 4, each of the pawls 40 includes a main body portion 46 extending radially from the inner proximal edge 42 to the outer distal edge 43 and opposing lateral sides 48, 50 seated adjacent and parallel to the opposing guide walls 26. A ledge portion 52 projects axially from the main body portion 46 adjacent the outer distal edge 43 defining an angled or tapered wedge surface 54 facing the inner proximal edge 42 and extending between the opposing lateral sides 48, 50. Further, a cylindrical guide pin 56 projects axially from the main body portion 46 adjacent the inner proximal edge 42.

The pawls 40 move radially inward and outward between the first and second positions in response to rotation of a shaft 60. The shaft 60 extends axially between opposite first and second ends 62, 64 through the first central bore 22 in the guide plate 12 and the second central bore 34 in the tooth plate 14. A recliner handle (not shown) is coupled to one of the ends 62, 64 of the shaft 60 for rotating the shaft 60 in opposite first and second directions as is commonly known in the art.

Figure 3:
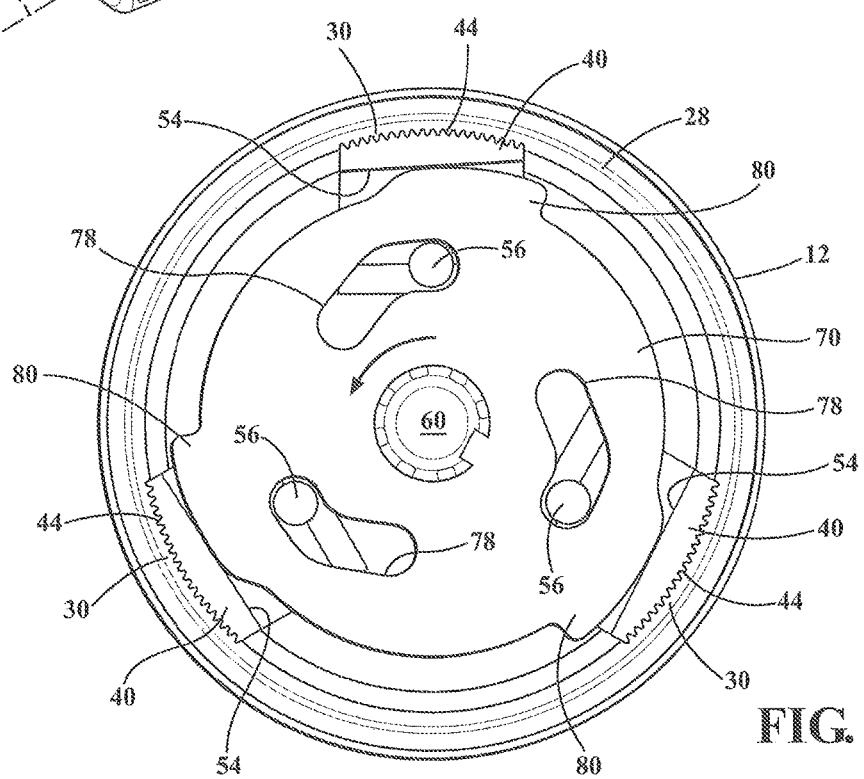
FIG. 3 is a plan view of the disc recliner assembly with the tooth plate removed.

A cam plate 70 is disposed adjacent the pawls 40 between the guide plate 12 and tooth plate 14 and is fixedly coupled to the shaft 60 for rotation therewith. That is, the cam plate 70 includes a third central bore 72 for axially receiving the shaft 40 therethrough. A locking tab 74 projects radially inwardly from the third central bore 72 and is slidably received in a corresponding channel 76 recessed along the axial length of the shaft 60 whereby the cam plate 70 is constrained from rotation with respect to the shaft 60 but allowed to slide axially along the shaft 60. The cam plate 70 is adapted and configured for moving the pawls 40 radially outwardly to the first position in response to rotation of the shaft 60 in the first direction and radially inward to the second position in response to rotation of the shaft 60 in the opposite second direction. More specifically, the cam plate 70 includes a plurality of slots 78 therein having an offset profile that receive, guide and engage guide pins 56 projecting orthogonally from the pawls 40 to move the pawls 40 radially outward in response to rotation of the shaft 60 in the first direction and radially inward in response to rotation of the shaft 46 in the opposite second direction. The cam plate 70 further includes a plurality of equally spaced apart radially projecting cam lobes 80 for camming engagement with the angled wedge surface 54 on the respective adjacent pawl 40 as shown in FIG. 3 for wedging the pawl 40 between the guide walls 26 and preventing chuck or movement between the guide plate 12 and tooth plate 14 when the disc recliner assembly 10 is in the locked condition.

Finally, a clock spring 82 encircles the shaft 60 and includes a first end secured to the shaft 60 and an opposite second end secured to the tooth plate 14 for biasing the shaft 60 in the first direction with the cam plate 70 forcing the pawls 40 radially outward to the first position such that the outwardly-facing teeth 44 on the pawls 40 are in meshing engagement with the inwardly-facing teeth 30, 38 on the guide plate 12 and tooth plate 14, respectively, to prevent rotation of the guide plate 12 relative to the tooth plate 14. Rotation of the shaft 60 in the opposite second direction rotates the cam 48 in the second direction, thereby moving the pawls 42 radially inward to the second position such that the outwardly facing teeth 44 on the pawls 42 are disengaged from the inwardly-facing teeth 41 on the tooth plate 24 to allow rotation of the tooth plate 24 relative to the guide plate 22.

Figure 9:
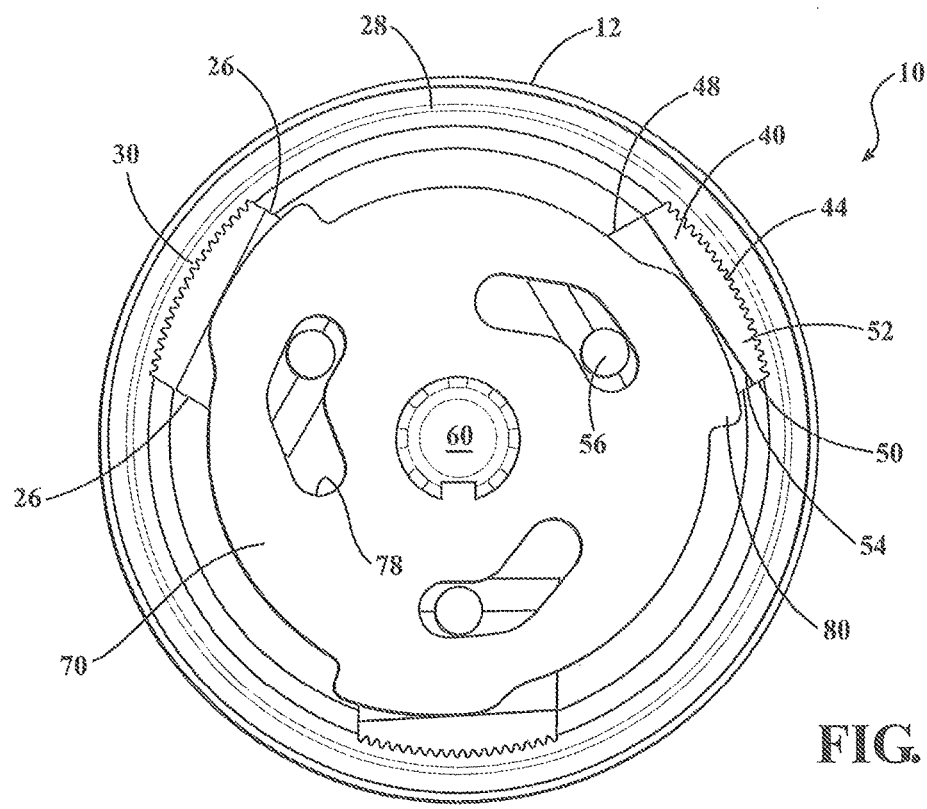
FIG. 9 is a plan view of the disc recliner assembly in the locked condition.
Figure 10:
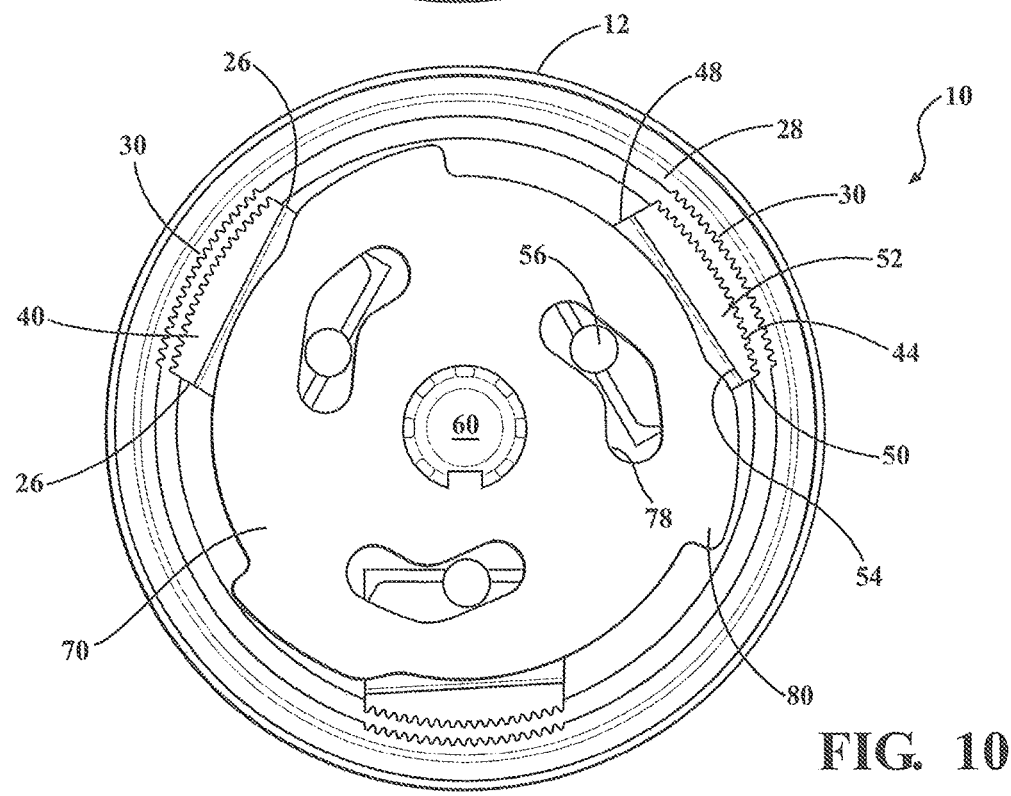
FIG. 10 is a plan view of the disc recliner assembly in an unlocked condition.

In operation, referring to FIGS. 9 and 10, in order to actuate the disc recliner assembly 10 from the locked condition (FIG. 9) to the unlocked condition (FIG. 10) and allow the seat back to pivot relative to the seat cushion, the shaft 60 is rotated by the recliner handle in the second direction, counterclockwise, against the bias of the spring 82. The rotation of the shaft 60 causes rotation of the cam plate 70 whereby the profiled slots 78 engage the guide pins 56 on the pawls 40 and retract the pawls 40 radially inwardly from the first, locked, position to the second, unlocked, position and spaced from engagement with the teeth 30, 38 on the guide plate 12 and tooth plate 14, respectively. Now with the disc recliner assembly 10 in the unlocked condition, the guide plate 12 is rotatable relative to the tooth plate 14 thereby allowing pivotal movement of the seat back relative to the seat cushion.

In order to return the disc recliner assembly 10 to the locked condition and prevent further pivotal movement of the seat back relative to the seat cushion, the recliner handle is released to rotate the shaft 60 in the first, clockwise, direction by the bias of the spring 82. As the spring 82 biases the shaft 60 to rotate in the first, clockwise, direction, the shaft 60 causes rotation of the cam plate 70 in the clockwise direction. The profiled slots 78 in the cam plate 70 engage the guide pins 56 and force the pawls 40 to slide radially outwardly along the guide walls 26 in the guide plate 12 until the teeth 44 of the pawls 40 mess into engagement with the teeth 30 and 38 on the guide plate 12 and tooth plate 14, returning the disc recliner assembly 10 to the locked condition to prevent pivotal movement of the guide plate 12 relative to the tooth plate 14 and thus preventing further pivotal movement of the seat back relative to the seat cushion.

Figure 5:
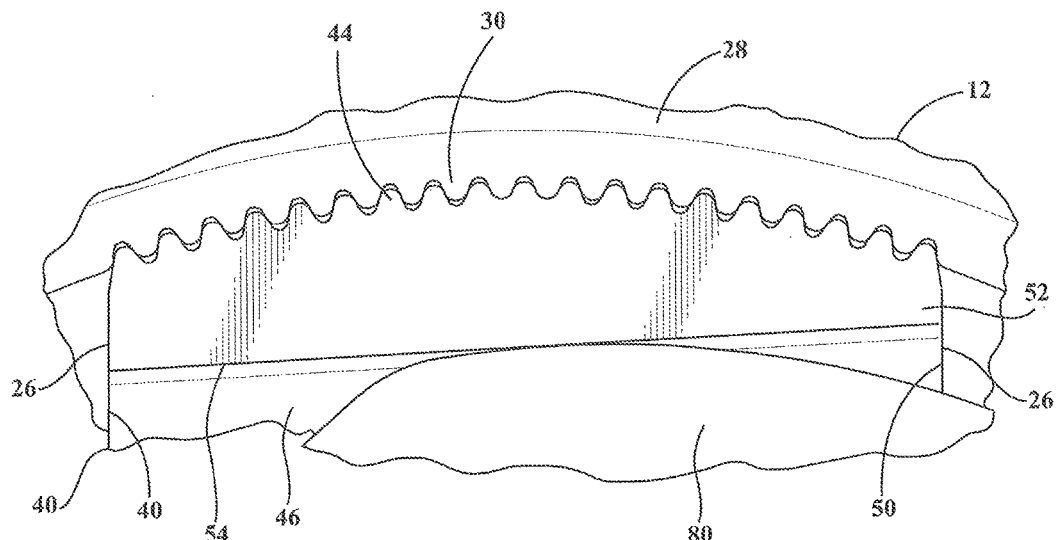
FIG. 5 is an enlarged, fragmentary plan view of the pawl engaged with the tooth plate in the locked condition.

Further, the cam lobes 80 on the radially outer edge of the cam plate 70 engage the angled or tapered wedge surfaces 54 on the pawls 40 to assist in moving the pawls 40 radially outwardly from the unlocked position to the locked position and also to apply a rotational movement to the pawls 40. The rotational moment causes the pawls 70 to rotate or tilt in the direction indicated by arrow 90, as shown in FIGS. 4 and 5, to wedge the pawl 40 between the opposing guide walls 26 and also wedge the teeth 44 of the pawls 40 against the teeth 30, 38 of the guide plate 12 and tooth plate 14 to prevent backlash and chuck between the guide plate 12 and the tooth plate 14 irrespective of the clearance or tolerance between the pawls 40 and the guide walls 26. Further, the angled wedge surface 54 increases in radial incline in the second, unlocking, direction to facilitate smooth and generally effortless release of the cam lobe 80 from the wedge surface 54 upon rotation of the cam plate 70 in the second, unlocking, direction to actuate the disc recliner assembly 10 to the unlocked condition.

The invention has been described herein in an illustrative manner, and it is to be understood that the terminology used is intended to be in the nature of words or description rather than limitation. Many modifications and variations of the present invention are possible in light of the above teachings. It is, therefore, to be understood that within the scope of the appended claims, the invention may be practiced other than as specifically enumerated within the description.

What is claimed:

1. A disc recliner assembly comprising:
a guide plate including at least one pair of spaced apart and parallel guide walls and an outer peripheral rim having a plurality of radially projecting teeth;
a tooth plate including an outer peripheral rim having a plurality of radially projecting teeth axially aligned with said teeth of said guide plate;
at least one pawl mounted between said guide plate and said tooth plate, said pawl including an inner proximal edge and an outer distal edge defined by a plurality of teeth, said pawl guided by said pair of guide walls between an unlocked position with said teeth of said pawl spaced and disengaged from teeth of said guide plate and said tooth plate to allow rotational movement of said guide plate relative to said tooth plate and a locked position with said teeth of said pawl in meshed engagement with said teeth of said guide plate and said tooth plate to prevent rotational movement of said guide plate relative to said tooth plate; and
a cam plate rotatably mounted between said guide plate and said tooth plate, and operatively coupled to said pawl wherein rotating said cam plate in a first direction moves said pawl radially outward with respect to said guide plate to said locked position engaged with said teeth of said guide plate and tooth plate and rotating said cam plate in an opposite second direction moves said pawl radially inward with respect to said guide plate to said unlocked position spaced and disengaged from said teeth of said guide plate and tooth plate; and
wherein said pawl includes a ledge portion facing opposite said teeth and defining an angled wedge surface and said cam plate includes at least one radially projecting cam lobe engaged with said angled wedge surface for applying a rotational moment to said pawl in said locked position thereby wedging said pawl between said pair of guide walls.

2. A disc recliner assembly as set forth in claim 1 wherein said pawl includes opposite first and second lateral sides, said first and second lateral sides generally parallel with and spaced apart from said pair of guides walls with said pawl in said unlocked position and said first and second sides wedged against said guide walls with said pawl in said locked position.

3. A disc recliner assembly as set forth in claim 2 wherein said cam plate includes at least one profiled slot therein and said pawl includes a axially projecting guide pin slidably received in said profiled slot for guiding said pawl between said locked position and said unlocked position in response to rotation of said cam plate between said first direction and said opposite second direction.

4. A disc recliner assembly as set forth in claim 3 wherein said guide plate includes a first central bore defining a central axis, said tooth plate includes a second central bore axially aligned with said first central bore and said cam plate includes a third central bore axially aligned with both said first and second central bores.

5. A disc recliner assembly as set forth in claim 4 further include an elongated shaft extending through said first, second and third central bores defining a pivot axis therethrough, said shaft operatively coupled to said cam plate for rotating said cam plate in said first and second direction and actuating said pawl between said locked and unlocked positions.

6. A disc recliner assembly as set forth in claim 5 further including a spring operatively coupled between said shaft and one of said guide plate and said tooth plate for biasing said cam plate in said first direction and said pawl in said locked position.

* * * * *